No. 780,976. PATENTED JAN. 31, 1905.
G. CIAPETTI.
PROCESS OF MAKING CREAM-OF-TARTAR.
APPLICATION FILED NOV. 12, 1903.
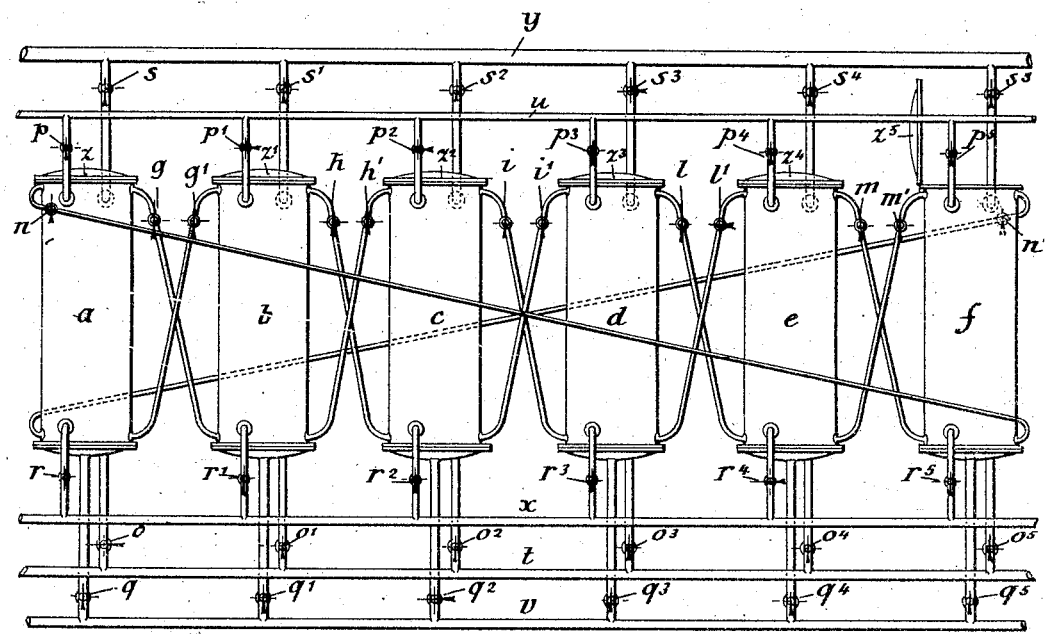

No. 780,976. Patented January 31, 1905.

UNITED STATES PATENT OFFICE.

GINO CIAPETTI, OF STRADA, ITALY.

PROCESS OF MAKING CREAM OF TARTAR.

SPECIFICATION forming part of Letters Patent No. 780,976, dated January 31, 1905.

Application filed November 12, 1903. Serial No. 180,927.

*To all whom it may concern:*

Be it known that I, GINO CIAPETTI, chemist, a subject of the King of Italy, residing at Strada, near Arezzo, Italy, have invented a certain new and useful Method of Obtaining Cream of Tartar from Marc, of which the following is a specification.

The apparatus consists of a battery of twelve wooden diffusing apparatus, four of which are shown on the drawing, marked $A'$ $A^2$ $A^3$ $A^4$. Each diffuser is provided with a steam-pipe, the admission of steam being regulated by means of cocks 6 $6'$ $6^2$ $6^3$.

The diffusing apparatus are charged with fresh and dry marc. After closing the apparatus steam is admitted into the first one, passes through the marc, and afterward through a pipe C into the next diffusing apparatus $A^2$, and so on.

Assuming that the diffusers operate in couples, the alcoholic vapors carried off by the steam pervading the marc instead of passing directly through $a$ on the tube B, which carries them to the distilling apparatus, they are compelled to pass upward through the second diffuser, so as to enrich themselves to a greater extent, and only at the outlet of the said second diffuser they pass into the said tube B through cock $b$, which is open, while cock $2^2$ is closed, as are all the other cocks. When on testing the alcoholic degree is found to be lowered, which means that the first diffuser, $A'$, is deprived of alcohol, the communication-cock $2'$, which carries the alcoholic vapors into the diffuser $A^2$, is closed, and the latter is connected by cock $2^2$ with the third diffuser, $A^3$, already filled with fresh marc. It will be understood that the second diffuser is then heated directly by the steam by opening the cock $6'$ immediately after closing the cock $2^2$, communicating between the first and the second diffuser, $A^2$. When the first diffuser is deprived of its alcohol, the steam-cock 6 is closed and cock $6'$ is opened. Thus the second diffuser acts as the first with regard to the third one, &c. The alcohol vapors from the third diffuser pass through the cock $c$ into the tube B, the cock $2^3$ of communication between the third and the fourth diffuser being closed. Suppose the diffusers $A'$ and $A^2$ are deprived of alcohol and in turn the third and the fourth ones are being similarly treated. A solution of sulfurous acid is injected into the first two diffusers to combine with the cream of tartar. Thus the position of the diffusers will be as follows: In the first diffuser, $A'$, the cocks 5, 6, $a$, 1, and 4 being closed the cock 3, branched on the tube D, supplies sulfurous acid from a supply-tank, and immediately afterward also cock $2'$ is opened. The sulfurous acid entering from below through cock 3 after having filled the first diffuser enters through the tube C into the second, $A^2$, from which after having passed through the marc therein contained by opening cock $1'$ passes into the tube H and thence to a filter I. In short, the sulfurous acid has the same circulation on the exhausted marc as the steam had before on the fresh marc.

The solution of sulfurous acid is contained in a tank V, placed at a height, say, forty or fifty feet above the diffusers. This solution, which is introduced at a pressure of two atmospheres, gradually passes through the marc and reacts with the cream of tartar, forming bisulfite of potash and releasing tartaric acid according to the following equation:

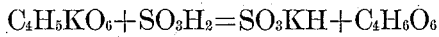
$$C_4H_5KO_6 + SO_3H_2 = SO_3KH + C_4H_6O_6$$

Both the bisulfite of potash and the tartaric acid being soluble in cold water, these two substances in consequence of the osmotic process become dissolved, while the sulfurous acid acts in its turn on the coloring-matter.

The alcoholic vapors when the last diffuser, $A^4$, as in the illustrated example, is under the direct pressure of the steam are forced to pass into the subsequent diffuser, which, as described, acts in pairs. The said vapors from diffuser $A^4$ before passing into the tube B recommence the cycle by passing by the tube $C^3$ to $A'$, which has been filled with fresh marc.

The first diffusing apparatus now containing marc deprived of its cream of tartar, the cock 3 is closed and cock 4, establishing communication with the water-tank T, opened. Water entering the apparatus displaces the tartaric solution and forces it to pass into the following diffusing apparatus. After the whole tartaric solution has been expelled the cocks are closed and the diffusing apparatus A', containing exhausted marc, isolated, the discharge-cock 5 opened, and the slightly-sulfurous water discharged into the tank 11. The vat is thereupon opened, the exhausted marc replaced by fresh, and the whole process begins over again. It follows, therefore, that in a battery of twelve or more diffusing apparatus distillation is going on in one third, marc is being exhausted in another third, while the last third is being charged.

The solutions of bisulfite of potash and tartaric acid after passing through the filter-press I are discharged into the vats M by means of a pipe L. The vats are made of wood lined with lead and are closed and heated by a steam-pipe G, regulated by means of cocks 7. The steam quickly raises the temperature of the tartaric solution to 80° centigrade, at which temperature bisulfite of potash becomes decomposed and sulfurous anhydrid or acid is generated and carried away by the steam generated. It is then pumped by a pump O through a pipe N and driven into the tower P through a perforated pipe Q. The tower is filled with coke continually washed by a water-spray from the tank U, which water on meeting the sulfurous anhydrid absorbs it and forms sulfurous acid, which collects in the tank 10, whence it is raised, by means of a pump R, to the tank V in order to circulate again through the pipe D. In the meantime the potassium hydrate, which has remained free in the vats M, combines with the free tartaric acid, forming bitartrate of potash, which remains in solution in the boiling water and being now deprived of impurities and coloring-matter passes through the pipe W into small vats 12, where it crystallizes. The water from the diffusing apparatus collecting in the tank 11 with the mother-lye from the small vats is forced back into the tank T by means of a pump S and is ready to circulate again. The cream of tartar, which has settled in the small vats after having been previously submitted to the action of centrifugal force, is dissolved again in boiling water. The solution is then filtered by means of a mechanical filter heated by steam, after which it is again run into the crystallizing vessels, and in this way a very white and pure cream of tartar is obtained.

*Utilization of marc from plastered must, (Moûts plâtrés.)*—The above-described process is also applicable to plastered marc, from which it was hitherto impossible to extract cream of tartar on account of sulfate of lime or gypsum with bitartrate of potash forming insoluble tartrate of lime; but sulfurous acid coming into contact with marc impregnated with that salt converts it very well into the bitartrate in accordance with the following equation:

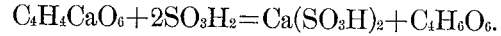

$$C_4H_4CaO_6 + 2SO_3H_2 = Ca(SO_3H)_2 + C_4H_6O_6.$$

As soon as sulfurous anhydrid, which is formed again, has been expelled the tartrate of lime, which is formed again, and the existing tartrate of potash settle in the crystallizing-vats. From the mixture of the two tartrates after having been submitted to the action of centrifugal force the proportion of tartrate of lime is determined, and then boiling water is poured over it in the proportion of fifteen hundred grams for each one hundred grams of tartrate of lime, and a charge of insoluble bisulfate of lime (separated by means of a mechanical filter) is added to it, and a corresponding quantity of cream of tartar is added to the one already existing. According to calculations 52.30 parts of bisulfite of potash are sufficient to decompose one hundred parts of tartrate of lime, giving about 72.30 parts of bitartrate of potash. After half an hour's boiling the substances are crystallized in the small vats.

*Application of the process to the gradual washing of marc.*—When instead of the direct distillation of marc it is considered advisable to make use of gradual washing of the same for the purpose of obtaining "small-wine" to be submitted to distillation and best alcohol, the cock 4 is opened instead of injecting steam into the diffusers. In that case pure water heated by a steam-jet gradually carries away the alcohol, and the small-wine discharged from the last diffusing apparatus of the battery escapes to the first pan at the top of a second continuous distillation-column, where it is exhausted. The water drawn off is discharged, by means of a separate conduit, into the tank 11, whence it is raised and used again for dissolving sulfurous anhydrid and then forced into the tank V by means of a pump R. From the tank V it descends into the diffusing apparatus in order that the tartrate may be obtained as has been described. The marc thus treated by a cold process and discharged from the diffusing apparatus is at first subjected to pressure and then screened in order to separate the pips, which after having been dried can be used to extract oil or as food for poultry.

*Utilization of mother-lye.*—The residue water is neutralized by means of a weak milk of lime. The precipitate of tartrate of lime is treated with bisulfate of potash, as already stated, so as to obtain cream of tartar by double decomposition. Theoretically the cycle is a complete one, and the sulfurous anhydrid used in the beginning of the process should be capable of being utilized indefinitely; but in practice a certain loss is unavoidable, although it is very small. This loss is compensated for by burning sulfur in furnaces arranged at the bottom of the column P.

What I claim as my invention, and desire to secure by Letters Patent, is—

1. The treatment of marc to obtain cream of tartar consisting in placing the marc in a series of closed vessels, passing steam therethrough in order to drive off the alcohol, then passing sulfurous acid through the vessels to form potassium bisulfate and tartaric acid, filtering this solution and decomposing the filtrate by heat into sulfurous anhydrid, potassium hydrate and tartaric acid whereby the sulfurous anhydrid is carried away by the steam while the potassium hydrate and tartaric acid combine to form bitartrate of potash substantially as described.

2. The treatment of marc to obtain cream of tartar consisting in placing the marc in a series of closed vessels, passing steam therethrough in order to drive off the alcohol, then passing sulfurous acid through the vessels to form potassium bisulfate and tartaric acid, filtering this solution and decomposing the filtrate by heat into sulfurous anhydrid potassium hydrate and tartaric acid whereby the sulfurous anhydrid is carried away by the steam while the potassium hydrate and tartaric acid combine to form bitartrate of potash, cooling the solution to crystallize the cream of tartar, redissolving the latter, filtering and recrystallizing substantially as set forth.

In testimony whereof I have signed my name to this specification in the presence of two subscribing witnesses.

GINO CIAPETTI.

Witnesses:
    PRONERO TERRARI,
    BELTRAND CARLO.